United States Patent
Todd et al.

(10) Patent No.: US 7,795,185 B2
(45) Date of Patent: Sep. 14, 2010

(54) MAGNESIUM PEROXIDE DIFUNCTIONAL COMPONENTS FOR CELLULOSE DERIVATIVES AND ASSOCIATED METHODS

(75) Inventors: Bradley L. Todd, Duncan, OK (US); Karen Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 329 days.

(21) Appl. No.: 11/494,303

(22) Filed: Jul. 27, 2006

(65) Prior Publication Data
US 2008/0026958 A1 Jan. 31, 2008

(51) Int. Cl.
*C09K 8/60* (2006.01)
*C09K 8/74* (2006.01)
*E21B 43/16* (2006.01)

(52) U.S. Cl. ............... 507/214; 507/269; 166/305.1
(58) Field of Classification Search ............... 507/214, 507/269; 166/305.1
See application file for complete search history.

(56) References Cited

U.S. PATENT DOCUMENTS

| | | | |
|---|---|---|---|
| 2,922,768 A | 1/1960 | Mino et al. ............... 260/17.4 |
| 4,982,793 A | 1/1991 | Holtmyer et al. ......... 166/305.1 |
| 5,067,565 A | 11/1991 | Holtmyer et al. ............ 166/305 |
| 5,122,549 A | 6/1992 | Holtmyer et al. ............ 523/130 |
| 5,304,620 A | 4/1994 | Holtmyer et al. ............ 527/310 |
| 5,439,057 A * | 8/1995 | Weaver et al. ............... 166/295 |
| 6,488,091 B1 * | 12/2002 | Weaver et al. ............... 166/300 |
| 6,719,053 B2 * | 4/2004 | Thompson ............... 166/305.1 |

* cited by examiner

Primary Examiner—Timothy J. Kugel
Assistant Examiner—Atnaf Admasu
(74) Attorney, Agent, or Firm—Robert A. Kent; McDermott Will & Emery LLC

(57) ABSTRACT

One example of the many methods provided includes a method comprising: providing a fluid loss control pill that comprises an aqueous base fluid, a cellulose derivative and a dual functional component, the fluid loss control pill having a first viscosity; allowing the dual functional component to interact with the cellulose derivative in the fluid loss control pill such that the viscosity of the fluid loss control pill increases to a second viscosity, the second viscosity being greater than the first viscosity; placing the fluid loss control pill in a subterranean formation; and allowing the dual functional component to interact with the cellulose derivative so as to reduce the second viscosity of the fluid loss control pill to a third viscosity, the third viscosity being less than the second viscosity.

17 Claims, No Drawings

MAGNESIUM PEROXIDE DIFUNCTIONAL COMPONENTS FOR CELLULOSE DERIVATIVES AND ASSOCIATED METHODS

BACKGROUND

The present invention relates to methods and compositions for treating subterranean formations, and more specifically, to dual functional components for cellulose derivatives for fluid loss control pills that are useful in petroleum recovery operations.

Providing effective fluid-loss control for well treatment fluids is highly desirable. A "well treatment fluid" is a fluid used in a subterranean application. The term "treatment" herein does not imply any particular action by the fluid or any component thereof. Fluid-loss control materials are additives specifically designed to lower the volume of a filtrate that passes through a filter medium. Most attain their fluid-loss control from the presence of solvent-specific solids, or from polymers that rely on filter cake buildup and on viscoelasticity to inhibit flow into and through the formation. A variety of fluid-loss control materials have been used and evaluated, including foams, oil-soluble resins, acid-soluble particulates, graded salt slurries, linear viscoelastic polymers, and heavy metal-crosslinked polymers. Their respective comparative effects are well documented.

Providing effective fluid-loss control for well treatment fluids is highly desirable. A "well treatment fluid" is a fluid used in a subterranean application. The term "treatment" herein does not imply any particular action by the fluid or any component thereof. Fluid-loss control materials are additives specifically designed to lower the volume of a filtrate that passes through a filter medium. Most attain their fluid-loss control from the presence of solvent-specific solids, or from hydrated linear polymers that rely on filter cake backup and on viscoelasticity to inhibit flow into and through the formation. A variety of fluid-loss control materials have been used and evaluated, including foams, oil-soluble resins, acid-soluble particulates, graded salt slurries, linear viscoelastic polymers, and heavy metal-crosslinked polymers. Their respective comparative effects are well documented.

Other techniques that have been developed to control fluid loss include the use of "fluid-loss control pills," which sometimes are referred to as "lost circulation pills." A "fluid-loss control pill," as that term is used herein, refers to a gelled fluid that is designed or used to provide some degree of fluid-loss control. Through a combination of viscosity, solids bridging, and cake buildup on the porous rock, these pills oftentimes are able to substantially seal off portions of the formation from fluid loss. They also generally enhance filter-cake buildup on the face of the formation to inhibit fluid flow into the formation from the well bore.

Typically, fluid-loss control pills comprise an aqueous base fluid and a high concentration of a gelling agent polymer (that is usually crosslinked), and sometimes, bridging particles, like graded sand, sodium salts, or sized calcium carbonate particles. The term "gel," as used herein and its derivatives, refers to a semi-solid, jelly-like state assumed by some colloidal dispersions. The most commonly used fluid-loss control pills contain high concentrations (100 to 150 lbs/1000 gal) of hydroxyethylcellulose ("HEC"). HEC is generally accepted as a gelling agent affording minimal permeability damage during completion operations. Normally, HEC polymer solutions do not form rigid gels, but control fluid loss by a viscosity-regulated or filtration mechanism. Some other gelling agent polymers that have been used include guar, guar derivatives, carboxymethylhydroxyethylcellulose ("CM-HEC"), and even starch.

As an alternative to linear polymeric gels for fluid-loss control pills, crosslinked gels often are used. Crosslinking the gelling agent polymer creates a gel structure that can support solids as well as provide fluid-loss control. Further, crosslinked fluid-loss control pills have demonstrated that they require relatively limited invasion of the formation face to be fully effective. To crosslink the gelling agent polymers, a suitable crosslinking agent that comprises polyvalent metal ions is usually used. Aluminum, titanium, and zirconium are common examples.

A commonly used crosslinkable gelling agent for fluid-loss control pills are graft copolymers of a hydroxyalkyl cellulose that are prepared by a redox reaction with vinyl phosphonic acid. The gel is formed by hydrating the graft copolymer in an aqueous fluid containing at least a trace amount of at least one divalent cation. The gel is crosslinked by the addition of a Lewis base or Bronsted-Lowrey base so that pH of the fluid is adjusted from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. This gel can be broken by reducing the pH of the fluid. Some fluid-loss pills of this type are described in U.S. Pat. Nos. 5,304,620, 4,982,793, 5,067,565, and 5,122,549, all of which are assigned to Halliburton Energy Services, the relevant disclosures of which are incorporated herein by reference. Fluid-loss control pills of this type are commercially available under the trade name "K-MAX" from Halliburton Energy Services in Duncan, Okla.

After their application, fluid-loss control pills can cause severe damage to near-well bore areas due to polymer filtration or filter-cake formation. At some point in the completion operation, the filter cake resulting from a fluid-loss control pill must be removed to restore the formation's permeability, preferably to at least its original level. If the formation permeability is not restored to its original level, production levels can be significantly reduced. This is often referred to as "breaking" the pill. The term "break" (and its derivatives) as used herein refers to a reduction in the viscosity of the fluid-loss control pill, e.g., by the breaking or reversing of the crosslinks between polymer molecules, or some breaking of the gelling agent polymers, or a degradation of the filter cake. No particular mechanism is implied by the term.

Removal of the fluid loss control pill and its filter cake is generally accomplished by using internal or external breakers. Internal breakers generally are water soluble materials that get mixed into the pill before the pill is pumped downhole. These can be water soluble solids, such as sodium persulfate, or water miscible liquids, such as t-butyl hydroperoxide. Generally, some effort is made in the testing of these breakers with the fluid loss control pill to give a period of service life of the pill before degradation by the breakers occurs. A problem with internal breakers is that breaker usually does not become concentrated in the filter cake with the polymer and leaks off into the formation with the filtrate. External breakers are generally strong acids (e.g., 10% to 15% hydrochloric acid) or oxidizer solutions that are applied to the pill by circulating the breaker solution into contact with the fluid loss control pill. Applying external breakers, through coil tubing for example, can be very time consuming and expensive, especially on offshore locations.

SUMMARY

The present invention relates to methods and compositions for treating subterranean formations, and more specifically, to dual functional components for cellulose derivatives for fluid loss control pills that are useful in petroleum recovery operations.

In one embodiment, the present invention provides a method comprising: providing a fluid loss control pill that comprises an aqueous base fluid, a cellulose derivative and a dual functional component, the fluid loss control pill having a first viscosity; allowing the dual functional component to interact with the cellulose derivative in the fluid loss control pill such that the viscosity of the fluid loss control pill increases to a second viscosity, the second viscosity being greater than the first viscosity; placing the fluid loss control pill in a subterranean formation; and allowing the dual functional component to interact with the cellulose derivative so as to reduce the second viscosity of the fluid loss control pill to a third viscosity, the third viscosity being less than the second viscosity.

In another embodiment, the present invention provides a method comprising: preparing or providing a fluid loss control pill that comprises an aqueous base fluid, a cellulose derivative, a dual functional component; introducing the fluid loss control pill into the subterranean formation; and allowing the fluid loss control pill to break into a lower viscosity fluid.

In another embodiment, the present invention provides a fluid loss control pill for treating subterranean formations comprising: an aqueous base fluid, and an apparent cross linked reaction production of a cellulose derivative and a dual functional component.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for treating subterranean formations, and more specifically, to dual functional components for cellulose derivatives for fluid loss control pills that are useful in petroleum recovery operations.

The present invention provides compositions and methods of affecting the viscosity of aqueous fluids comprising cellulose derivatives. More particularly, the present invention provides "dual functional components" that are chemical compositions that have a dual functionality when interacting with a cellulose derivative in an aqueous fluid. The terms "dual functional" or "dual functionality" refer to the apparent effect that the components have on the viscosity of an aqueous fluid that comprises a cellulose derivative as a result of their interaction with a cellulose derivative contained therein. As a result of their dual functionality, a measurable change in the viscosity of the fluid can be observed. For instance, assume at $time_1$ ($T_1$), a treatment fluid has a viscosity$_1$ ($V_1$). By utilizing a dual functional component of the present invention, at $T_2$, the treatment fluid should have a $V_2$, and at $T_3$, the treatment fluid should have a $V_3$. $V_2$ should be greater than $V_1$, and $V_2$ should be greater than $V_3$. In certain embodiments, $V_3$ may be less than $V_1$. It is believed that the cellulose derivative becomes crosslinked as a result of its interactions with the dual functional component, and that this may lead to the increase in viscosity seen at $V_2$. The result of this phenomenon may be referred to as "an apparent crosslinked reaction product of the cellulose derivative and the dual functional component."

One of the many benefits of the present invention is that it is a single component that causes the increased viscosity of the pill ($V_2$) and eventually is involved in the reduction the viscosity of the pill ($V_3$). Moreover, these dual functional components can become concentrated within a filter cake, which can aid in the breaking of that filter cake at a desired time.

The fluid loss control pills of the present invention may be used for carrying out a variety of subterranean well treatments, including, but not limited to, being used as diverting agents, conformance agents, fluid loss pills, and as gel pigs, if desired. Essentially, the pills of the present invention can be used in any subterranean well treatment that benefits from a temporarily crosslinked polymer fluid.

The fluid loss control pills of the present invention comprise an aqueous base fluid, a cellulose derivative, and a dual functional component. The term "cellulose derivative" as used herein includes cellulose that has had a crosslinkable site grafted on to it. In certain embodiments, the fluid loss control pills may comprise an acid generating component. Optionally, other additives that are suitable for use in conjunction with fluid loss control pills in subterranean applications may be included as well.

The aqueous base fluids used in the fluid loss control pills of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the fluid loss control pills of the present invention, for example, copper ions, iron ions, or certain types of organic materials (e.g., lignin). In certain embodiments, the density of the aqueous base fluid can be increased, among other purposes, to either match the density of a fluid in the well bore or make sure that the pill stays in a certain place within a well bore. One of ordinary skill in the art with the benefit of this disclosure will recognize the appropriate density for a given application. For instance, in some instances, it may be desirable to make a fluid loss control pill of the present invention heavier than other fluids. In other instances, it may be desirable to maintain the fluid loss control pill within a certain location within a well bore, and therefore, have its density be such that it does not fall beneath that desired location or rise above that location.

In some embodiments, the cellulose derivatives of the present invention are prepared by reacting certain allyl or vinyl monomers having a crosslinkable substituent, such as vicinal dihydroxy groups or a vinyl phosphonic acid, with a cellulose derivative using a redox system comprising ceric ions and nitric acid. The generalized reaction is believed to be represented by the following formula:

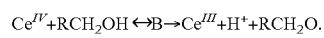
$$Ce^{IV}+RCH_2OH \leftrightarrow B \rightarrow Ce^{III}+H^++RCH_2O.$$

wherein B is the ceric-alcohol complex, $RCH_2OH$ is the cellulose derivative, and $RCH_2O$. is a free radical. Graft copolymerizations of cellulose commonly use chemical initiators such as ceric ions. In acid media, ceric ions oxidize 1,2-glycols with the formation of a free radical on a reducing agent, which the cellulose derivative in this case. The free radical produced on the cellulose derivative initiates polymerization with the vinyl group of the monomer to produce the graft copolymer. Such reactions are discussed in U.S. Pat. No. 5,122,549, for example, the relevant disclosure of which is hereby incorporated by reference.

The cellulose derivatives used in conjunction with the present invention are preferably a hydroxyalkyl cellulose having a hydroxyalkyl molar substitution from about 1.5 to about 3. "Molar substitution" as that term is used herein refers to the average number of moles of a substituent group present per anhydrogluclose unit of the cellulose material. The alkyl group is selected from the group of ethyl, propyl, and mixtures thereof. The preferred hydroxyalkyl cellulose is hydroxyethyl cellulose (HEC) having a molar substitution in the range of about 1.8 to about 2.5.

The cellulose derivatives used in the present invention are rendered crosslinkable by grafting certain allyl or vinyl monomers having vicinal dihydroxy groups or a vinyl phosphonic acid to the cellulose derivative. The monomers have a reactive moiety (e.g., $CH_2=C^-$) that is believed to enable the monomer to attach to a hydroxyl group of the cellulose derivative. The monomer may also provide a crosslinkable substituent, such as a vicinal hydroxy group or a phosphonate group, which enables the copolymer to crosslink upon solvation. The preferred grafting monomers for practicing the invention include, but are not limited to, glyceryl allyl ether (GAE), 1,2-dihydroxypropylmethacrylate (DHPM), vinyl phosphonic acid (VPA), allyl glycidyl ether (AGE), and glycidyl methacrylate (GMA). Others may also be suitable. For cellulose derivatives comprising both AGE and GMA, the epoxide group must be hydrolyzed to render the polymer crosslinkable. The most preferred grafting monomers are GMA and VPA.

Preferably in this invention, the hydroxyalkylation of the cellulose is preformed in a separate reaction. Hydroxyethyl cellulose is usually formed by reacting ethylene oxide with cellulose under extreme alkaline conditions and is available commercially. Methods of grafting monomers on polyhydroxy containing compounds are well known in the art. The process is described in U.S. Pat. No. 2,922,768, herein incorporated by reference. U.S. Pat. Nos. 4,982,783; 5,067,565; and 5,122,549, the entire disclosures of which are incorporated herein by reference, describe processes by which cross linkable cellulose derivatives are prepared by grafting vinyl or allyl monomers having a cross linkable substituent onto the cellulose derivative. The resulting copolymer is non-ionic and crosslinks readily with polyvalent metal cations to form stable viscoelastic gels. A preferred cellulose derivative for use in the present invention is available from Halliburton Energy Services in Duncan, Okla. under the tradename "K-MAX."

Additionally, in general, any of the water-soluble cellulose ethers can be used in the practice of the invention. Those cellulose ethers which can be used include, among others, the various carboxyalkyl cellulose ethers, such as carboxyethyl cellulose and carboxymethyl cellulose (CMC); mixed ethers such as carboxyalkyl ethers, such as carboxymethyl hydroxyethyl cellulose (CMHEC); hydroxyalkyl celluloses such as hydroxyethyl cellulose (HEC) and hydroxypropyl cellulose; alkyhydroxyalkyl celluloses such as methylhydroxypropyl cellulose; alkyl celluloses such as methyl cellulose, ethyl cellulose and propyl cellulose; alkylcarboxyalkyl celluloses such as ethylcarboxymethyl cellulose; and alkylalkyl celluloses such as methylethyl cellulose; and hydroxyalkylalkyl celluloses such as hydroxypropylmethyl cellulose; and the like. A preferred derivatized cellulose is a hydroxyethyl cellulose grafted with vinyl phosphonic acid such as disclosed in U.S. Pat. No. 5,067,565. The entire disclosure of which is incorporated herein by reference.

In some embodiments, the cellulose derivatives of the fluid loss control pills of the present invention may be prepared by reacting certain vinyl monomers having a crosslinkable substituent with a cellulose derivative using a redox system comprising the reaction product of hydrogen peroxide with a ferrous salt.

The following patents are incorporate herein by reference with respect to suitable cellulose derivatives for use in the present invention: U.S. Pat. Nos. 5,122,549; 5,304,620; and 4,982,793.

In certain embodiments, the cellulose derivative may be present in the fluid loss control pills of the present invention in an amount in the range of from about 0.1% to about 10% by weight of the aqueous base fluid therein, more preferably in an amount of from about 1% to about 2%, and most preferably about 1.5%. The particular amount to use will be dictated by the application to which the fluid loss control pill will be put, as recognized by one skilled in the art with the benefit of this disclosure. Some applications may require more, while others may require less.

The dual functional components used in the present invention are chemical compositions that have a dual functionality when interacting with a cellulose derivative in an aqueous fluid. As a result of their dual functionality, a measurable change in the viscosity of the fluid can be observed. For instance, assume at $time_1$ ($T_1$), a treatment fluid has a $viscosity_1$ ($V_1$). By utilizing a dual functional component of the present invention, at $T_2$, the treatment fluid should have a $V_2$, and at $T_3$, the treatment fluid should have a $V_3$. $V_2$ should be greater than $V_1$, and $V_2$ should be greater than $V_3$. In certain embodiments, $V_3$ may be less than $V_1$. The change observed at $V_2$ is thought to be due to a crosslinking reaction, and the change at $V_3$ is thought to be due to a breaking reaction. Suitable dual functional components include magnesium peroxides, calcium peroxides, and zinc peroxides, and derivatives and combinations thereof. Magnesium peroxide may be preferred because magnesium peroxide produces hydrogen peroxide, which is useful for breaking down the cellulose derivative. In certain embodiments, the dual functional component is present in the fluid loss control pills of the present invention in an amount in the range of from about 0.01% to about 5% by weight of the water therein. The amount needed may depend on the temperature of the subterranean formation. At lower temperatures, one might expect to add more because a faster transition from $V_2$ to $V_3$ may be desired. Conversely, at higher temperatures, less might be needed to obtain a desired transition time from $V_2$ to $V_3$.

Optionally, a second breaker may be added to the fluid loss control pills of the present invention. These may include an external breaker solution such as an acid, or an internal breaker, such as an acid generating component. The acidic protons that are generated from the acid or the acid generating component may interact with the dual functional component in such a manner as to produce hydrogen peroxide, which is a strong oxidizer that can be beneficial to the clean up process.

It may be especially beneficial to add an acid generating component at lower temperatures to aid in the clean up of the pill. Using such acid generating components in conjunction with the fluid loss control pills of the present invention may allow these fluids to be used in well bores that have a lower temperature, e.g., room temperature to 180° F. They also may allow for a faster and more efficient clean up. Suitable acid generating components for use in the present invention include any component that will generate an acid down hole that can be used in the manners described. Specific examples include, but are not limited to, esters, orthoesters, lactones, lactides, anhydrides, poly(orthoesters), and poly(esters). Other examples include aliphatic polyesters; poly(lactides); poly(glycolides); poly(ε-caprolactones); poly(hydroxybutyrates); poly(anhydrides); aliphatic polycarbonates; poly (ortho esters); poly(amino acids); poly(ethylene oxide); polyphosphazenes; poly(adipic anhydrides), poly(suberic anhydrides), poly(sebacic anhydrides), and poly(dodecanedioic anhydrides); poly(maleic anhydrides); poly(benzoic anhydrides); and derivatives or combinations thereof. If used, the acid generating components should be present in a stoichiometric amount to convert a portion of the dual functional component to hydrogen peroxide. In certain embodiments, this may be from about 0.01% to about 5% by weight of the water therein.

The fluid loss control pills of the present invention optionally may comprise one or more additional additives known in the art, including, but not limited to, fluid loss control additives, gel stabilizers, gas (e.g., carbon dioxide or nitrogen), salts (e.g., KCl), pH-adjusting agents (e.g., buffers), corrosion inhibitors, dispersants, flocculants, acids, foaming agents, antifoaming agents, $H_2S$ scavengers, lubricants, oxygen scavengers, weighting agents, scale inhibitors, surfactants, catalysts, clay control agents, biocides, friction reducers, particulates, nonemulsifiers, solvents, mutual solvents, paraffins, asphaltenes, hydrate inhibitors, derivatives thereof, and combinations thereof. One of ordinary skill in the art may recognize other suitable additives. For example, a gel stabilizer compromising sodium thiosulfate may be included in certain treatment fluids of the present invention.

The fluid loss control pills of the present invention may be prepared using any suitable methodology. In some embodiments, they may be prepared "on the fly," for example, the dual functional components may be injected into a stream of the treatment fluid comprising an aqueous fluid and a cellulose derivative during pumping. Other additives, such as those described above, may be combined with the treatment fluid of the present invention as desired for a particular application. The fluid loss control pills of the present invention may be prepared using a batch method as well.

In one embodiment, the present invention provides a method of treating a subterranean formation comprising the steps of: providing an aqueous treatment fluid that comprises a cellulose derivative and a dual functional component, the aqueous treatment fluid having a first viscosity; allowing the dual functional component to interact with the cellulose derivative such that the viscosity of the aqueous treatment fluid increases to a second viscosity, the second viscosity being greater than the first viscosity; placing the aqueous treatment fluid into a subterranean formation; and allowing the dual functional component to interact with the cellulose derivative so as to reduce the second viscosity of the aqueous treatment fluid to a third viscosity, the third viscosity being less than the second viscosity.

A method of the present invention for treating a subterranean formation penetrated by a well bore comprises the steps of: preparing or providing a fluid loss control pill that comprises an aqueous base fluid, a cellulose derivative, a dual functional component; introducing the fluid loss control pill into the subterranean formation; and allowing the fluid loss control pill to break into a lower viscosity fluid.

A preferred a fluid loss control pill of this invention for treating subterranean formations comprises: an aqueous base fluid, and an apparent cross linked reaction production of a cellulose derivative and a dual functional component.

To facilitate a better understanding of the present invention, the following examples of certain aspects of some embodiments are given. In no way should the following examples be read to limit, or define, the entire scope of the invention.

EXAMPLES 928 ml of 9.6 lb/gal KCl/NaBr brine was added to a Waring Blender. 44 ml of WG-33 (available from Halliburton Energy Services, Duncan, Okla.) polymer was added. 5 ml of 20° Be HCl was added. The mixture was mixed in the Waring Blender until a vortex at the top of the mixture closed. The mixture was then allowed to hydrate for 1 hour with no shear. 200 ml of the mixture was removed to form each test sample. Table 1 shows which components and how much of those components were added to each test samples. "BIOVERT H150" is a delayed release acid (available from Halliburton Energy Services, Duncan, Okla.); and "CL-30" is a cross linker (available from Halliburton Energy Services, Duncan, Okla.). $MgO_2$ is the dual functional component being tested. Each sample was placed in a jar by itself and allowed to set at room temperature for one hour to ensure cross linking. A marble was placed on the top of each sample to demonstrate a competent cross link. This polymer system did not lend itself to viscosity reading in its cross linked state since the system did not flow. Each marble had the same weight and size. The jars containing the cross linked pills were then placed in a 178° F. water bath. Observations were recorded daily. Whether the sample was broken or unbroken was determined by visual inspection as to whether the sample would support a marble. Table 2 summarizes the observations.

TABLE 1

| Component | Control 1 - (No dual functional component or delayed acid component) | Control 2 - (No dual functional component) | Sample 1 (200 ml) | Sample 2 (200 ml) | Sample 3 (200 ml) |
| --- | --- | --- | --- | --- | --- |
| BIOVERT H150 | 0 g | 5 g | 5 g | 5 g | 6.8 g |
| $MgO_2$ | 0 g | 0 g | 0.7 g | 1.4 g | 2.1 g |
| CL-30 | 1 g | 1 g | 0.5 g | 0 g | 0 g |

TABLE 2

| Day | Control (No dual functional component or delayed acid component) | Control - (No dual functional component) | Sample 1 | Sample 2 | Sample 3 |
| --- | --- | --- | --- | --- | --- |
| 0 Before adding cross linker | 200 cP | 200 cP | 200 cP | 200 cP | 200 cP |
| 0 After adding cross liner | Marble at the surface | Marble at the surface | Marble at the surface | Marble at the surface | Marble at the surface |

TABLE 2-continued

| Day | Control (No dual functional component or delayed acid component) | Control - (No dual functional component) | Sample 1 | Sample 2 | Sample 3 |
|---|---|---|---|---|---|
| 1 | Marble at the surface | Marble at the surface | Marble at the surface | Marble on Bottom with some cross linking of pill | Marble on bottom with some cross linking of pill |
| 2 | Marble at the surface | Marble at the surface | Broken - No evidence of cross linking remaining | Broken - No evidence of cross linking remaining | Broken - No evidence of cross linking remaining |
| 3 | Marble at the surface | Marble on bottom - pill weaker than at beginning on day 1 but pill retains shape of the jar. Marble descended approximately 0 to 1 inch. | | | |
| 4 | Marble at the surface | Marble on bottom - pill no longer supports marble; | | | |
| 5 | Marble at the surface | Broken - No evidence of cross linking remaining | | | |

The initial viscosity of the hydrated gel (Day 0, before adding cross linker) is $V_1$. The samples that are cross linked well enough to support a marble are $V_2$. The following viscosity readings are examples of $V_3$. On day 1 viscosity readings were taken of Samples 1, 2, and 3. A Fan 35, #1 bob, #1 spring was used at 300 RPMs. Sample 1 had a viscosity of 22 cP at 154° F.; Sample 2 had a viscosity of 4.5 cP @ 153° F.; and Sample 3 had a viscosity of 4 cP at 150° F. On day 4, the Control 2 sample had a viscosity of 137 cP at 300 rpm at 155° F.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:

providing a fluid loss control pill that comprises an aqueous base fluid, a cellulose derivative and a dual functional component, the fluid loss control pill having a first viscosity;

wherein the cellulose derivative comprises a cellulose grafted with a monomer selected from the group consisting of a glyceryl allyl ether, a 1,2-dihydroxypropylmethacrylate, a vinyl phosphonic acid monomer, an allyl glycidyl ether, a glycidyl methacrylate monomer, and a combination thereof;

allowing the dual functional component to interact with the cellulose derivative in the fluid loss control pill such that the viscosity of the fluid loss control pill increases to a second viscosity, the second viscosity being greater than the first viscosity;

placing the fluid loss control pill in a subterranean formation; and allowing the dual functional component to interact with the cellulose derivative so as to reduce the second viscosity of the fluid loss control pill to a third viscosity, the third viscosity being less than the second viscosity.

2. The method of claim 1 wherein the second viscosity is a result of a crosslinking reaction comprising the cellulose derivative and the dual functional component.

3. The method of claim 1 wherein the fluid loss control pill comprises an external acid breaker or an acid-generating component.

4. The method of claim 3 wherein the acid-generating component is chosen from the group consisting of: esters; orthoesters; lactones; lactides; anhydrides; poly(orthoesters); poly(esters); aliphatic polyesters; poly(lactides); poly(glycolides); poly(ε-caprolactones); poly(hydroxybutyrates); poly(anhydrides); aliphatic polycarbonates; poly(ortho esters); poly(amino acids); poly(ethylene oxide); polyphosphazenes; poly(adipic anhydrides), poly(suberic anhydrides); poly(sebacic anhydrides); poly(dodecanedioic anhydrides); poly(maleic anhydrides); poly(benzoic anhydrides); and derivatives or combinations thereof.

5. The method of claim 1 wherein the fluid loss control pill is being used as a diverting agent, a conformance agent, or a gel pig.

6. The method of claim 1 wherein the fluid loss control pill is placed into the subterranean formation before the first viscosity of the fluid loss control pill increases to the second viscosity.

7. The method of claim 1 wherein the cellulose derivative is present in the fluid loss control pill in an amount in the range of from about 0.1% to about 10% by weight of the base fluid therein.

8. The method of claim 1 wherein the dual functional component is chosen from the group consisting of: magnesium peroxides; calcium peroxides; zinc peroxides; and derivatives and combinations thereof.

9. The method of claim 1 wherein the dual functional component is present in an amount in the range of from about 0.01% to about 5% by weight of the water therein.

10. The method of claim 1 wherein the fluid loss control pill comprises an additive chosen from the group consisting of: fluid loss control additives; gel stabilizers; gases; salts; pH adjusting agents; buffers; corrosion inhibitors; dispersants; flocculants; acids; foaming agents; antifoaming agents; $H_2S$ scavengers; lubricants; oxygen scavengers; weighting agents; scale inhibitors; surfactants; catalysts; clay control agents; biocides; friction reducers; particulates; nonemulsifiers; solvents; mutual solvents; paraffins; asphaltenes; hydrate inhibitors; and derivatives and combinations thereof.

11. A method comprising:
preparing or providing a fluid loss control pill that comprises an aqueous base fluid, a cellulose derivative, and a dual functional component;
wherein the cellulose derivative comprises a cellulose grafted with a monomer selected from the group consisting of a glyceryl allyl ether, a 1,2-dihydroxypropylmethacrylate, a vinyl phosphonic acid monomer, an allyl glycidyl ether, a glycidyl methacrylate monomer, and a combination thereof;
introducing the fluid loss control pill into the subterranean formation; and
allowing the fluid loss control pill to break into a lower viscosity fluid.

12. The method of claim 11 wherein the fluid loss control pill comprises an external acid breaker or an acid-generating component chosen from the group consisting of: esters; orthoesters; lactones; lactides; anhydrides; poly(orthoesters); poly(esters); aliphatic polyesters; poly(lactides); poly(glycolides); poly($\epsilon$-caprolactones); poly(hydroxybutyrates); poly(anhydrides); aliphatic polycarbonates; poly(ortho esters); poly(amino acids); poly(ethylene oxide); polyphosphazenes; poly(adipic anhydrides), poly(suberic anhydrides); poly(sebacic anhydrides); poly(dodecanedioic anhydrides); poly(maleic anhydrides); poly(benzoic anhydrides); and derivatives or combinations thereof.

13. The method of claim 11 wherein the dual functional component is chosen from the group consisting of: magnesium peroxides; calcium peroxides; zinc peroxides; and derivatives and combinations thereof.

14. The method of claim 11 wherein the dual functional component is present in an amount in the range of from about 0.01% to about 5% by weight of the water therein.

15. The method of claim 11 wherein the fluid loss control pill is prepared on-the-fly.

16. A fluid loss control pill for treating subterranean formations comprising: an aqueous base fluid, and an apparent cross linked reaction production of a cellulose derivative and a dual functional component, wherein the cellulose derivative comprises a cellulose grafted with a monomer selected from the group consisting of a glyceryl allyl ether, a 1,2-dihydroxypropylmethacrylate, a vinyl phosphonic acid monomer, an allyl glycidyl ether, a glycidyl methacrylate monomer, and a combination thereof.

17. The fluid loss control pill of claim 16 wherein the dual functional component is chosen from the group consisting of: magnesium peroxides; calcium peroxides; zinc peroxides; and derivatives and combinations thereof.

* * * * *